United States Patent
Lee et al.

(10) Patent No.: US 11,539,612 B2
(45) Date of Patent: Dec. 27, 2022

(54) TESTING VIRTUALIZED NETWORK FUNCTIONS

(71) Applicant: Metaswitch Networks Ltd, Enfield (GB)

(72) Inventors: Andrew Lee, Enfield (GB); David Hotham, Enfield (GB); Joe Powell, Enfield (GB); Philip Davies, Enfield (GB); Michael Duppre, Enfield (GB); Jamie Parsons, Enfield (GB); Steve Orbell, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 0 days.

(21) Appl. No.: 16/850,812

(22) Filed: Apr. 16, 2020

(65) Prior Publication Data

US 2020/0344144 A1 Oct. 29, 2020

(30) Foreign Application Priority Data

Apr. 23, 2019 (GB) ...................................... 1905653

(51) Int. Cl.
*H04L 43/50* (2022.01)
*H04L 12/46* (2006.01)
(Continued)

(52) U.S. Cl.
CPC .......... *H04L 43/50* (2013.01); *H04L 12/4641* (2013.01); *H04L 41/0895* (2022.05);
(Continued)

(58) Field of Classification Search
CPC . H04L 43/50; H04L 12/4641; H04L 63/0272; H04L 41/0893; H04L 41/0895;
(Continued)

(56) References Cited

U.S. PATENT DOCUMENTS 9,794,160 B1 * 10/2017 Felstaine ................. H04L 43/04
11,018,899 B1 * 5/2021 Melkild ............. G06F 9/45558
(Continued)

OTHER PUBLICATIONS

Search Report for United Kingdom Application No. GB1905653.0, dated Oct. 17, 2019, 4 pages.
(Continued)

*Primary Examiner* — Glenton B Burgess
*Assistant Examiner* — Rachel J Hackenberg
(74) *Attorney, Agent, or Firm* — Han Gim; Newport IP, LLC (57) ABSTRACT

According to a first aspect, there is provided a method of testing a plurality of virtual network functions (VNFs) during commissioning of the plurality of VNFs in a virtualized environment in a customer network, the method comprising: at a VNF testing component configured to have access to the virtualized environment of the customer network, performing interoperability testing between a first VNF component instantiation (VNFCI) within a first VNF of the plurality of VNFs and a second VNFCI within a second VNF of the plurality of VNFs, the second VNF being different from the first VNF, the first VNF and the second VNF comprising a subset of VNFs within the plurality of VNFs, wherein performing the interoperability testing comprises: instructing the first VNFCI to interoperate directly with the second VNFCI in a predetermined manner; and determining whether the second VNFCI reacts to the instructed direct interoperation in an expected manner.

21 Claims, 7 Drawing Sheets

(51) Int. Cl.
  *H04L 43/20* (2022.01)
  *H04L 41/0895* (2022.01)
  *H04L 41/40* (2022.01)
  *H04L 9/40* (2022.01)
  *G06F 9/455* (2018.01)
(52) U.S. Cl.
  CPC .............. *H04L 41/40* (2022.05); *H04L 43/20* (2022.05); *G06F 2009/45595* (2013.01); *H04L 63/0272* (2013.01)
(58) Field of Classification Search
  CPC .................... H04L 41/40; H04L 43/20; G06F 2009/45595
  See application file for complete search history.

(56) References Cited

U.S. PATENT DOCUMENTS

| | | | | |
|---|---|---|---|---|
| 2017/0359231 | A1* | 12/2017 | Chawki | H04L 41/0806 |
| 2018/0107577 | A1* | 4/2018 | Johnsson | G06F 11/3428 |
| 2018/0152347 | A1* | 5/2018 | Dhandu | H04L 41/0816 |
| 2018/0357099 | A1* | 12/2018 | Browne | G06F 9/5055 |
| 2019/0052548 | A1* | 2/2019 | Kojukhov | H04L 41/5038 |
| 2019/0052551 | A1* | 2/2019 | Barczynski | H04L 67/1008 |
| 2019/0104047 | A1* | 4/2019 | Tejaprakash | H04L 41/22 |
| 2019/0342187 | A1* | 11/2019 | Zavesky | H04L 41/5009 |
| 2020/0028772 | A1* | 1/2020 | Laslau | H04L 41/145 |
| 2020/0267072 | A1* | 8/2020 | Prasad | G06F 9/45558 |
| 2022/0255803 | A1* | 8/2022 | Li | H04L 41/0895 |

OTHER PUBLICATIONS

Search Report for UK Patent Application No. GB1905653.0 dated Oct. 22, 2019, 4 pages.
"Notice of Allowance Issued in United Kingdom Patent Application No. 1905653.0", dated Aug. 23, 2022, 2 Pages.
"Office Action Issued in United Kingdom Patent Application No. 1905653.0", dated Jul. 19, 2022, 3 Pages.

* cited by examiner

TESTING VIRTUALIZED NETWORK FUNCTIONS

CROSS-REFERENCE TO RELATED APPLICATIONS

This application claim priority to United Kingdom Patent Application No. 1905653.0, filed Apr. 23, 2019, the contents of which is incorporated herein by reference in its entirety.

INTRODUCTION

Technical Field

The present disclosure relates to testing virtual network functions. In particular, but not exclusively, the present disclosure relates to testing virtual network functions during commissioning of the virtual network functions in a virtualized environment of a customer network.

BACKGROUND

Network function virtualization (NFV) is used to virtualize network functions to create communication services. Instead of providing custom hardware appliances for each network function, a virtualized network function (VNF) may comprise one or more virtual machines (VMs) running various software and processes, instantiated on standard server equipment, switches, storage devices and/or cloud computing architecture.

Commissioning a VNF typically involves instantiating the VMs that are required to perform the VNF, and configuring such VMs to perform the VNF. The commissioning process may include (and/or precede) testing of the VNF.

In some known systems, VNF testing involves testing whether individual VMs, once instantiated, are actually up and running. In some other known systems, VNF testing involves performing end-to-end testing across a chain of fully configured VMs (e.g. in the form of a test call). However, when such a test fails it may be difficult (or in some cases impossible) to determine why it has failed. Some systems employ internal monitoring to detect when an undesired state has been entered, and subsequently provide an alert for a user. For example, a VM could detect that it has lost connectivity to another node and alert the user through various user interface elements, such as logs, alarm messages, or other error notifications. In such cases, the user would then investigate and determine an underlying cause for the fault. However, some errors and/or faults associated with the VNF may not be readily identifiable (or may be misidentified) using such known tests. This may particularly be the case when a customer has performed the commissioning of the VNF themselves. Such tests may therefore be insufficient and/or unreliable, and may result in significant engineer time being required to debug and fix such problems manually.

It is therefore desirable to provide improved methods for testing VNFs.

BRIEF SUMMARY

According to a first aspect, there is provided a method of testing a plurality of virtual network functions (VNFs) during commissioning of the plurality of VNFs in a virtualized environment in a customer network, the method comprising: at a VNF testing component configured to have access to the virtualized environment of the customer network, performing interoperability testing between a first VNF component instantiation (VNFCI) within a first VNF of the plurality of VNFs and a second VNFCI within a second VNF of the plurality of VNFs, the second VNF being different from the first VNF, the first VNF and the second VNF comprising a subset of VNFs within the plurality of VNFs, wherein performing the interoperability testing comprises: instructing the first VNFCI to interoperate directly with the second VNFCI in a predetermined manner; and determining whether the second VNFCI reacts to the instructed direct interoperation in an expected manner.

The method of the first aspect enables potential faults and/or errors associated with the VNFs to be more reliably detected and/or fixed, compared to known methods. For example, testing that VNFCIs in isolation are functioning may be insufficient to reliably show that the overall VNF deployment will work as expected. By testing interoperability between VNCFIs in different VNFs, issues arising from misconfiguration and/or networking problems between VNFCIs that are intended to communicate with one another may be identified, and subsequently remedied. As such, a greater range of potential issues can be accurately identified compared to known systems, facilitating a more reliable diagnosis mechanism. Moreover, issues may be discovered at an earlier stage in the commissioning process compared to known methods, thereby reducing an amount of wasted time and/or resources and resulting in a more efficient commissioning process.

According to a second aspect, there is provided an apparatus comprising at least one processor and at least one memory including computer program code, the at least one memory and the computer program code being configured to, with the at least one processor, cause the apparatus at least to perform a method for testing a plurality of virtual network functions (VNFs) during commissioning of the plurality of VNFs in a virtualized environment in a customer network, the method comprising: at a VNF testing component configured to have access to the virtualized environment of the customer network, performing interoperability testing between a first VNF component instantiation (VNFCI) within a first VNF of the plurality of VNFs and a second VNFCI within a second VNF of the plurality of VNFs, the second VNF being different from the first VNF, the first VNFCI and the second VNFCI comprising a subset of VNFCIs instantiated within the plurality of VNFs, wherein performing the interoperability testing comprises: instructing the first VNFCI to interoperate directly with the second VNFCI in a predetermined manner; and determining whether the second VNFCI reacts to the instructed direct interoperation in an expected manner.

According to a third aspect, there is provided a computer program product comprising a non-transitory computer-readable storage medium having computer-readable instructions stored thereon, the computer-readable instructions being executable by a computerized device to cause the computerized device to perform a method of testing a plurality of virtual network functions (VNFs) during commissioning of the plurality of VNFs in a virtualized environment in a customer network, the method comprising: at a VNF testing component configured to have access to the virtualized environment of the customer network, performing interoperability testing between a first VNF component instantiation (VNFCI) within a first VNF of the plurality of VNFs and a second VNFCI within a second VNF of the plurality of VNFs, the second VNF being different from the first VNF, the first VNFCI and the second VNFCI comprising a subset of VNFCIs instantiated within the plurality of VNFs, wherein performing the interoperability testing comprises: instructing the first VNFCI to interoperate directly with the second VNFCI in a predetermined manner; and determining whether the second VNFCI reacts to the instructed direct interoperation in an expected manner.

According to a fourth aspect, there is provided a method of testing a plurality of virtual network functions (VNFs) during commissioning of the plurality of VNFs in a virtualized environment in a customer network, the method comprising: at a virtualized VNF testing component instantiated in the virtualized environment in the customer network, performing end-to-end integration testing of the plurality of VNFs, the end-to-end integration testing involving VNFCIs instantiated within each of the VNFs in the plurality of VNFs, wherein the end-to-end integration testing comprises the virtualized VNF testing virtual machine: configuring each VNFCI instantiated in the plurality of VNFs with predetermined end-to-end integration test configuration data; and determining whether each VNFCI operates in an expected manner during end-to-end integration testing.

The method of the fourth aspect enables an increase in the reliability and/or versatility of end-to-end testing of VNFs. Configuring the VNFCIs with predetermined test configuration data allows greater control over the end-to-end test process compared to a case in which such predetermined test configuration data is not used (e.g. where the routing in the environment is unknown and/or where the configuration data comprises only real customer configuration data). If the configuration (e.g. routing) of the system is unknown, the correct behavior of the system may be unclear and/or undefined, and thus it may be unclear what behavior the end-to-end test should check for. Using predetermined end-to-end test configuration data therefore allows a known behavior of the system to be checked. Further, such predetermined end-to-end integration test configuration data may be re-used for multiple different customer networks, unlike customer network specific configuration data. This may result in a more efficient end-to-end testing mechanism.

According to a fifth aspect, there is provided a method of testing a virtualized environment in a customer network for commissioning a virtual network function (VNF) in the virtualized environment, the method comprising: at a virtualized VNF testing component of a virtual machine instantiated within the virtualized environment in the customer network, performing environment readiness testing by interrogating a virtual infrastructure manager (VIM) component of the virtualized environment in the customer network to determine whether the virtualized environment comprises sufficient resources to fulfil commissioning of the VNF; and in response to the environment readiness testing determining that the virtualized environment does comprise sufficient resources to fulfil commissioning of the VNF, instructing, at a virtualized virtual network function manager (VNFM) component, the VIM component to instantiate one or more virtual network function component instantiations (VNFCIs) in the virtualized environment, the one or more VNFCIs being operable to perform at least a part of the VNF.

By performing environment readiness testing prior to instantiating one or more VNFCIs, the likelihood of errors associated with such VNFCIs (e.g. arising from insufficient resources being available to adequately run the VNFCIs) may be reduced. This in turn may reduce an amount of wasted time (e.g. in diagnosing, fixing, re-configuring and/or re-instantiating VNFCIs) compared to a case in which environment readiness testing is not performed by the virtualized VNF testing component, thereby resulting in a more efficient commissioning process.

It should be appreciated that features described in relation to one aspect of the present disclosure may be incorporated into other aspects of the present disclosure. For example, a method aspect may incorporate any of the features described with reference to an apparatus aspect and vice versa.

BRIEF DESCRIPTION OF THE DRAWINGS

Embodiments of the present disclosure will now be described by way of example only with reference to the accompanying schematic drawings of which.

DETAILED DESCRIPTION

Figure 1:
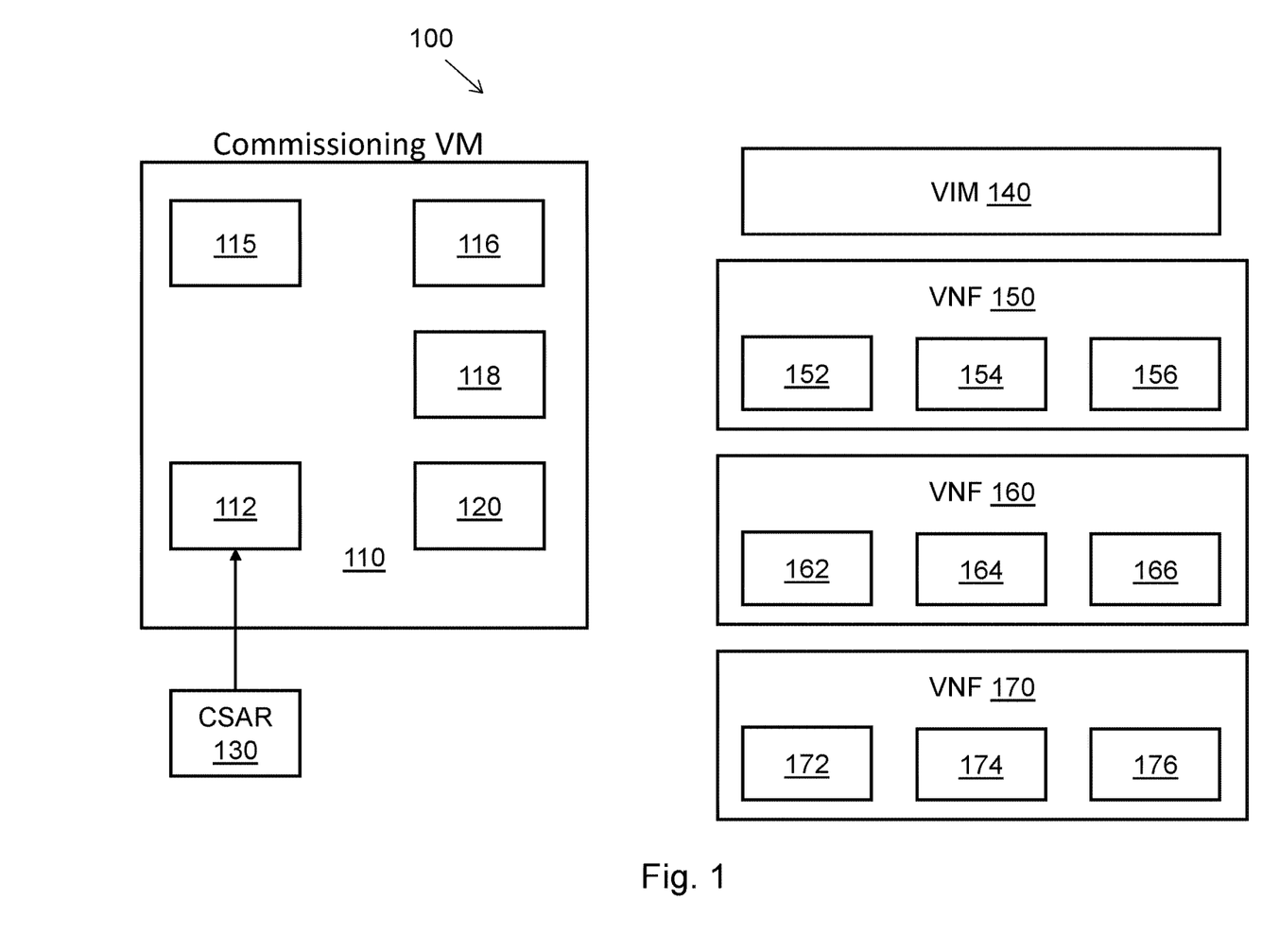
FIG. 1 shows a schematic view of a virtualized environment of a customer network according to embodiments of the present disclosure.

Referring to FIG. 1, there is shown a virtualized environment 100 of a customer network, according to embodiments. The environment 100 includes a commissioning virtual machine (VM) 110. The commissioning VM 110 is configured to commission virtualized network functions (VNFs) according to embodiments of the present disclosure. A VNF is configured to perform a particular network function, and multiple VNFs may be used within a virtualized environment. An example of a VNF is a telephony service, or a part thereof.

The commissioning VM 110 is instantiated in the virtualized environment 100 of the customer network. As such, the commissioning VM 110 may be running on one or more physical resources associated with the customer network.

In these embodiments, the commissioning VM 110 comprises a remote access connection facility 115. The remote access connection facility 115 may comprise a virtual private network (VPN) connection facility. For example, the remote access connection facility 115 may comprise a VPN server function. The remote access connection facility 115 comprises other connection means in alternative embodiments. The remote access connection facility 115 enables the commissioning VM 110 be accessed remotely from outside the customer network. For example, the remote access connection facility 115 may be useable to access the commissioning VM 110 from a VNF software provider network, or from any other network or location, via an Internet Protocol (IP) address associated with the VPN server function on the commissioning VM 110. Remote access to the commissioning VM 110 may be provided for a remote commissioning engineer, according to embodiments.

In embodiments, the commissioning VM 110 also comprises a VNF manager component 116, a VNF descriptor component 112, a version control component 118, and a VNF testing component 120, as will be described in more detail below. The various components 112, 115, 116, 118, 120 of the commissioning VM 110 are logically distinct from one another, according to embodiments. In alternative embodiments, one or more of the components 112, 115, 116, 118, 120 may be logically combined with one or more other of the components 112, 115, 116, 118, 120.

One or more of the components 112, 115, 116, 118, 120 may be created in response to, or as part of, instantiation of the commissioning VM 110. For example, one or more of the components 112, 115, 116, 118, 120 may be created automatically when the commissioning VM 110 is instantiated. As such, relatively little configuration of the commissioning VM 110 is required by a customer, and after instantiation of the commissioning VM 110 an engineer can access the commissioning VM 110 via the remote access connection facility 115, to perform subsequent configuration, instantiation and/or testing steps in the environment 100. The commissioning VM 110 may be relatively easy for a customer to instantiate, compared to a case in which the customer is required to instantiate (and configure) other VMs in the environment that are to perform the VNF. The commissioning VM 110, which is dedicated to the task of instantiating and configuring other VMs to perform VNFs, is less complex and/or more lightweight than such other VMs, and is thus easier for a customer to instantiate and/or configure. Further, the customer only instantiates a single VM (namely the commissioning VM 110), rather than multiple VMs in the environment 100. Moreover, in embodiments, the commissioning VM 110 can be instantiated and/or configured without knowledge of the particular properties of the customer network. That is, the commissioning VM 110 may be provided as a "standard" VM, instead of being bespoke to the particular customer network. Data that is customer network-specific can be provided at a later stage, by the remote engineer.

In alternative embodiments, one or more of the components 112, 115, 116, 118, 120 are created manually and/or based on user input following instantiation of the commissioning VM 110. In alternative embodiments, the commissioning VM 110 is not instantiated by a customer. For example, instantiation of the commissioning VM 110 may be performed remotely, e.g. via a remote access connection facility in a further VM.

The commissioning VM 110 may comprise more, fewer and/or different components in other embodiments. For example, commissioning VM 110 may not comprise the version control component 118 in some embodiments.

The commissioning VM 110 has access to a virtual infrastructure manager (VIM) component 140 of the virtualized environment 100. The VIM component 140 may be configured to manage the virtualized infrastructure of the environment 100. Additionally or alternatively, the VIM component 140 may be configured to monitor and/or manage the allocation of virtual resources to physical resources in the customer network, manage hardware and/or software resources associated with the environment 100, and/or collect performance data from VMs within the environment 100.

In embodiments, the VIM component 140 is capable of instantiating VMs in the virtualized environment 100. Such VMs could be instantiated manually, e.g. by a customer interacting with the VIM component 140 in the customer network. However, customer-instantiated VMs may be relatively prone to errors and/or misconfigurations. In contrast, in some embodiments of the present disclosure, instantiation of VMs may be controlled via the commissioning VM 110, which has access to the VIM component 140. The commissioning VM 110, in turn, may be controlled remotely via the remote access connection facility 115, e.g. by a commissioning engineer. Therefore, the need for the customers themselves to instantiate the VMs for performing the VNFs is reduced.

In these embodiments, the commissioning VM 110 is configured to instruct the VIM component 140 to instantiate first VMs 152, 154, 156 that are operable to perform a first VNF 150, second VMs 162, 164, 166 that are operable to perform a second VNF 160, and third VMs 172, 174, 176 that are operable to perform a third VNF 170. Other embodiments may comprise different numbers of VNFs and VMs. The commissioning VM 110 is logically distinct from the VIM component 140 and each of the VMs that perform the desired VNFs. However, the commissioning VM 110 may be located on the same physical machine as the VIM component 140 and/or the VMs. Alternatively, the commissioning VM 110 may be located on a different physical machine to the VIM component 140 and/or the VMs.

An example of the functionality of the commissioning VM 110 will now be described.

In embodiments, the commissioning VM 110 downloads at least one cloud service archive (CSAR) file 130. The at least one CSAR file 130 contains configuration data for commissioning the VNFs. Such configuration data may, in some examples, be non-specific to the particular customer network. In alternative embodiments, the at least one CSAR file 130 contains customer-specific configuration data. The at least one CSAR file 130 may contain configuration data that relates to one or more particular types of VNF. In other words, the at least one CSAR file 130 may contain VNF description data. Different CSAR files may contain description data for different VNFs. In some examples, a given CSAR file contains description data for multiple VNFs. The at least one CSAR file 130 may contain one or more software images. The at least one CSAR file 130 may contain other data and/or files in other embodiments. For example, the at least one CSAR file 130 may contain tests (or data useable indicating such tests) that are applicable to a given VNF. The at least one CSAR file 130 is downloaded to the commissioning VM 110, e.g. for storage and/or further processing. In alternative embodiments, file and/or data types other than CSAR files are used to obtain configuration data.

In embodiments, the at least one CSAR file 130 is downloaded from a predetermined location and/or address. The at least one CSAR file 130 may be downloaded automatically in some examples. For example, the at least one CSAR file 130 may be downloaded in response to instantiation of the commissioning VM 110. Such automated download of CSAR files may be faster and/or less prone to human error than a case in which one or more CSAR files are obtained manually.

In embodiments, the at least one CSAR file 130, upon execution by the commissioning VM 110, is operable to provide description data to the VNF descriptor component 112 that is within the commissioning VM 110. Such description data may be used to provide the VNF descriptor component 112 with a template defining the VNFs that are to be commissioned in the customer network.

In embodiments, customer network specific configuration data is downloaded, e.g. via the remote access connection facility 115. The customer network specific configuration data may be user-defined. For example, the customer network specific configuration data may be obtained via user input, e.g. by a remote commissioning engineer accessing the commissioning VM 110 via the remote access connection facility 115. In some examples, the customer network specific configuration data is downloaded from a predetermined location and/or file, having been previously stored in said location and/or file.

The customer network specific configuration data comprises configuration data that is specific to the particular customer network in which the VNFs are to be commissioned. For example, the customer network specific configuration data may include data relating to one or more of: available physical resources, available virtual resources, desired network size, population, type, location, infrastructure, storage and any other capabilities and/or properties of the customer network. Such configuration data may not be present in the CSAR files 130, which contain more general, non-customer network specific configuration data. The customer network specific configuration data may be used to supplement and/or enhance the configuration data obtained from the downloaded CSAR files 130.

In some embodiments, the downloaded customer network specific configuration data is stored in the version control component 118 within the commissioning VM 110. Such configuration data may be stored for further use during and/or after the commissioning process. Such configuration data may be used during a testing process, according to embodiments.

In embodiments, the VNF descriptor component 112 of the commissioning VM 100 provides a description of the VNFs to the VNF manager component 116. In embodiments, the description of the VNFs is provided on the basis of customer network specific configuration data and data obtained from the at least one CSAR file 130. In embodiments, the VNF descriptor component 112 is configured to combine the customer network specific configuration data with the data obtained from the least one CSAR file 130. The customer network specific configuration data may be provided to the VNF descriptor component 112 by the version control component 118. In other words, the customer network specific configuration data may be downloaded, stored on the version control component 118, and then provided to the VNF descriptor component 112. In alternative embodiments, the customer network specific configuration data is provided to the VNF descriptor component 112 by other means, e.g. by receiving data via the remote access connection facility 115 without storing such data in the version control component 118. In embodiments, the customer network specific configuration data is used to fill in details in the VNF description data obtained from the CSAR files 130. For example, the customer network specific configuration data may be used to populate a template obtained from the CSAR files 130. In other words, generic CSAR files are modified on-site with customer-specific configuration data to obtain VNF descriptions.

In embodiments, the version control component 118 is configured to provide configuration data to the VNF manager component 116 during commissioning of the VNFs. Such configuration data may comprise customer network specific configuration data. In embodiments, the configuration data provided by the version control component 118 comprises "Day 0" configuration data. "Day 0" configuration data comprises data to enable an initial setup of VMs. For example, "Day 0" configuration data may enable each newly-commissioned VM to be booted (or "spun") up, and/or to obtain an IP address. An IP address allows a given VM to communicate with other virtual and/or non-virtual machines. Therefore, in embodiments, the commissioning VM 110 may be considered to be responsible for at least "Day 0" of the commissioning process.

In embodiments, the VNF manager component 116 instructs the VIM component 140 to instantiate VMs in the virtualized environment 100. Such an instruction from the VNF manager component 116 is on the basis of the description of the VNFs provided by the VNF descriptor component 112.

In embodiments, the VNF manager component 116 is configured to perform lifecycle management of VNFs in the environment 100. For example, the VNF manager component 116 may be configured to cause instantiation, scaling, updating, upgrading and/or termination of VNFs. The VNF manager component 116 may be configured to manage a single VNF or multiple VNFs. The managed VNFs may be of the same or different types. The VNF manager component 116 may be configured via the remote access connection facility 115. In embodiments, configuration of the VNF manager component 116 may involve providing the VNF manager component 116 with a description of each VNF that is being commissioned.

In embodiments, data defining how the VNFs have been commissioned is stored within the customer network, and/or is uploaded via the remote access connection facility 115. Such data may be stored in the version control component 118 or elsewhere. Such data may comprise the "Day 0" data as described above. The data defining how the VNFs have been commissioned may be for future use in one or more of: a disaster recovery, a VNF version upgrade, and a VNF version rollback. The data defining how the VNFs have been commissioned may be for future use in other scenarios in other embodiments. In some cases, the data defining how the VNFs have been commissioned is used by the VNF testing component 120, e.g. as a reference from which to ascertain expected behavior of VMs within the environment 100. In some examples, the data defining how the VNFs have been commissioned is used for debugging and/or diagnosis purposes. Such debugging and/or diagnosis may be performed by the commissioning VM 110, for example.

In alternative embodiments, the commissioning VM 110 downloads a CSAR file that contains customer network specific configuration data, rather than generic configuration data. In such embodiments, a VNF description may be extracted from the CSAR file directly into the VNF manager component 116. Therefore, there may be no need to modify generic configuration files on-site with customer-specific configuration data. Thus, in some embodiments, the commissioning VM 110 does not comprise a VNF descriptor component 112. In some embodiments, generic configuration files are modified on-site with customer-specific configuration data, but in the absence of a VNF descriptor component 112.

In embodiments, the VNF testing component 120 is configured to test one or more of the VNFs 150, 160, 170 during commissioning of the VNFs 150, 160, 170 in the environment 100. The VNF testing component 120 is configured to have access to the virtualized environment 100, and is configured to perform one or more different types of testing on the VNFs 150, 160, 170, as will be described in more detail below. In embodiments, the VNF testing component 120 is controlled remotely, e.g. by a remote engineer accessing the commissioning VM 110 via the remote access connection facility 115. In some embodiments, the VNF testing component 120 is configured to perform one or more types of testing automatically, e.g. in response to a predetermined trigger event. Examples of such a trigger event include, but are not limited to, expiry of a predetermined time period, instantiation, updating, upgrading and/or teardown of VMs and/or VNFs, a VNF version upgrade, a VNF version rollback, a topology change, a hardware change and a disaster recovery. The VNF testing component 120 may be configured to perform one or more types of testing in accordance with a predetermined testing sequence.

Although FIG. 1 depicts the VNF testing component 120 as being comprised in a commissioning VM, in some embodiments the VNF testing component 120 is not comprised in a commissioning VM. That is, the VNF testing component 120 may be used in the absence of a commissioning VM, e.g. as a separate entity. In some cases, the VNF testing component 120 is comprised in a deployment manager (not shown). Such a deployment manager may be configured to manage configuration of VNFCIs during commissioning of the VNFs. In some embodiments, the deployment manager is configured to manage "Day 1" configuration of the VNFCIs, in that such configuration occurs after the "Day 0" configuration controlled by the commissioning VM 110. The deployment manager may manage a topology of the VNFCIs, for example. That is, the deployment manager may be configured to manage interrelationships between different VNFCIs. The VNF testing component 120 may be located elsewhere in other embodiments. For example, the VNF testing component 120 may be located on an element management system (EMS). Such an EMS may be configured to manage the configuration of one or more VNFs in the virtualized environment.

The VNF testing component 120 may be configured to receive topology information indicating a topology of VNFCIs in the environment 100. The VNF testing component 120 may receive such topology information from the deployment manager, from the commissioning VM 110, and/or from another entity. The commissioning VM 110 and/or the deployment manager may store such topology information. As such, in embodiments in which the VNF testing component 120 is comprised in the commissioning VM 110 or the deployment manager, the VNF testing component 120 may access (and employ) information that is already stored on the commissioning VM 110 or the deployment manager. In embodiments in which the VNF testing component 120 is comprised in the commissioning VM 110, the topology information may be received by the commissioning VM 110 from the deployment manager.

In embodiments, the VNF testing component 120 is a virtualized entity. In alternative embodiments, the VNF testing component 120 is a non-virtualized (e.g. physical) entity.

FIGS. 2A to 2D show the VNF testing component 120 interacting with other components in the environment 100.

FIGS. 2A to 2D depict different types of VNF testing which can be performed by the VNF testing component 120. In some embodiments, all of the types of testing depicted are performed during commissioning of one or more VNFs. In alternative embodiments, one or more of the types of testing are performed and one or more of the types of testing are not performed. The different types of testing may be performed for the same or for different VNFs in the environment 100. The tests depicted may also be performed in any order, according to various embodiments of the present disclosure.

Figure 2A:
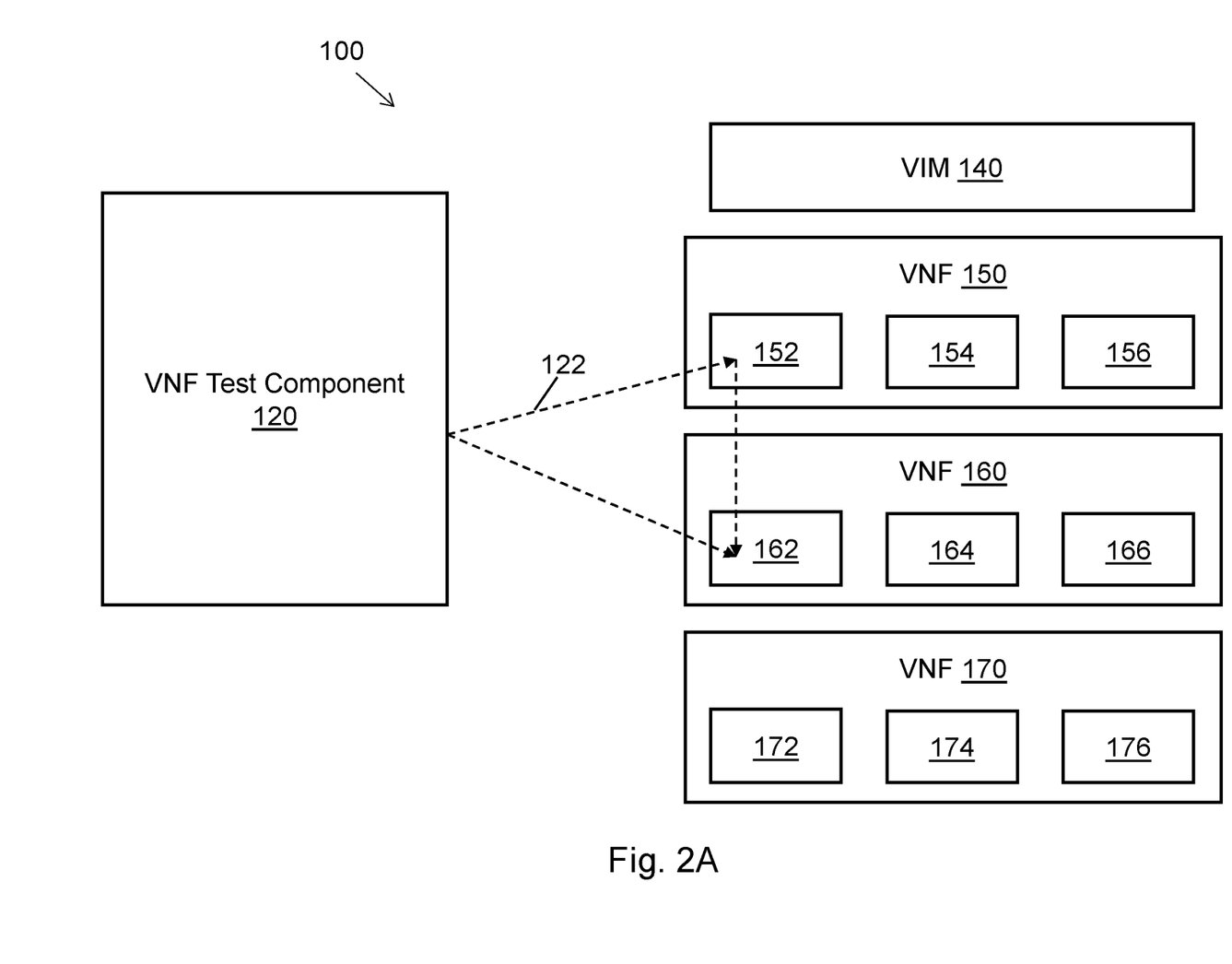
FIGS. 2A to 2D show schematic views of a virtualized environment of a customer network according to embodiments of the present disclosure.

Referring to FIG. 2A, the VNF testing component 120 performs interoperability testing 122. In this embodiment, the interoperability testing 122 comprises testing interoperability between a first VNFCI 152 within a first VNF 150 and a second VNFCI 162 within a second VNF 160. Each VNFCI in the environment 100 may be considered to be a separate VM. The first and second VNFs 150, 160 comprise a subset of VNFs within the plurality of VNFs 150, 160, 170 in the environment 100.

Performing the interoperability testing 122 comprises instructing the first VNFCI 152 to interoperate directly with the second VNFCI 162 in a predetermined manner, and determining whether the second VNFCI 162 reacts to the instructed direct interoperation in an expected manner. For example, the first VNFCI 152 may be instructed to transmit a test message or test data to the second VNFCI 162, or vice-versa.

In embodiments, determining whether the second VNFCI 162 reacts to the instructed direct interoperation in an expected manner comprises monitoring operation of the second VNFCI 162. The second VNFCI 162 may be the intended recipient of a test message from the first VNFCI 152, for example. Monitoring operation of the second VNFCI 162 may therefore involve determining whether such a test message has been received.

In embodiments, the determining whether the second VNFCI 162 reacts to the instructed direct interoperation in an expected manner comprises monitoring operation of the first VNFCI 152. Monitoring operation of the first VNFCI 152 may therefore involve determining whether the test message was sent and/or whether an acknowledgement from the second VNFCI 162 was received at the first VNFCI 152.

In embodiments, the determining whether the second VNFCI 162 reacts to the instructed direct interoperation in an expected manner comprises monitoring operation of one or more VNFCIs within the plurality of VNFs other than the first VNFCI 152 and the second VNFCI 162. Such other VNFCIs may be communicatively coupled with the first VNFCI 152 and/or the second VNFCI 162. In such embodiments, the monitoring operation may involve monitoring whether a third VNFCI receives a message from the second VNFCI in response to the second VNFCI receiving a test message from the first VNFCI.

In some embodiments, performing the interoperability testing 122 comprises instructing each of the first VNFCI 152 and the second VNFCI 162 to interoperate directly with the other of the first VNFCI 152 and the second VNFCI 162.

The first VNF 150 may be considered to be "adjacent" to the second VNF 160, in that the two VNFCIs 152, 162 are configured to interoperate directly, rather than via other VNFCIs. In embodiments, the first and second VNFs 150, 160 form part of an overall chain of VNFs. As such, the interoperation, or interaction, between the first VNFCI 152 and the second VNFCI 162 may correspond to a single "hop" in the virtualized environment 100. In alternative embodiments, the interoperation between the first VNFCI 152 and the second VNFCI 162 corresponds to multiple "hops". That is, the first VNFCI 152 may be configured to interoperate with the second VNFCI 162 via one or more other VNFCIs in one or more other VNFs in such alternative embodiments.

Testing interoperability between VNCFIs in different VNFs allows issues arising from misconfiguration and/or networking problems between VNFCIs that are intended to communicate with one another to be identified, and subsequently remedied. As such, a greater range of potential issues can be accurately identified compared to a case in which such interoperability tests are not performed, resulting in a more reliable diagnosis mechanism. The granularity of interoperability testing may be between that of testing individual VNFCIs and that of end-to-end testing. Performing interoperability testing may therefore uncover different potential issues and/or errors compared to such other tests.

Moreover, performing interoperability testing 122 may be more sophisticated, accurate and/or reliable than using an alarm-based error detection system. In such a comparative system, a VNFCI triggers an alarm when it senses a loss of connectivity. However, such a system may not test the various hops in the VNF deployment, and so is relatively unsophisticated. For example, for a chain of VNFCIs A→B→C in which A has an alarm, if the connection B→C is broken, A would not report a problem. Such a problem may therefore go unreported and/or undiagnosed in some cases. However, using interoperability testing, each of the direct connections A→B and B→C would be actively tested, allowing the broken connection B→C to be readily detected and diagnosed, instead of passively waiting for a problem to occur. Further, alarm-based error detection systems may rely on real end-to-end traffic. In contrast, interoperability testing according to embodiments may be performed at an earlier stage in the commissioning process, before real end-to-end traffic is introduced.

In embodiments, the VNF testing component 120 is logically distinct from other components within the customer network. In particular, the VNF testing component 120 may be logically distinct from the first VNFCI 152 and the second VNFCI 162. As such, the VNF testing component 120 comprises an objective point of truth for the interoperability testing. For example, the first VNFCI 152 and/or the second VNFCI 162 may be malfunctioning, but may be unaware of such. That is, the VNFCIs 152, 162 may be unable to objectively determine whether the interoperation between them is occurring as expected. The VNF testing component 120, however, being a separate logical component which can access and oversee the virtualized environment 100, can objectively determine whether or not the interoperation is as expected.

Moreover, using the VNF testing component 120 to perform the interoperability testing may reduce a need for an external testing user to access (e.g. via a Secure Shell (SSH) connection or other means) both of the VNFCIs 152, 162. For example, both a "transmitting" VNFCI and a "receiving" VNFCI would have to otherwise be accessed by an external testing user in order to determine whether the instructed interoperation was as expected. Since the VNF testing component 120 is configured to objectively oversee the topology of the environment 100, such access of both of the VNFCIs themselves may be avoided in some embodiments.

In embodiments, the VNF testing component 120 uses topology information indicating a topology of VNFCIs in the environment 100 to perform the interoperability testing 122. Using such topology information allows the VNF testing component 120 to objectively test the interoperation of VNFCIs which are intended to interoperate. Such topology information may comprise, or may be derived from, "Day 1" configuration data. Such "Day 1" configuration data may be managed and/or stored at a deployment manager, in some embodiments. In alternative embodiments, such topology information may comprise, or may be derived from, "Day 0" configuration data (e.g. data including subnet information), and/or a combination of "Day 0" configuration data and "Day 1" configuration data.

In alternative embodiments, interoperability testing is performed between two VNFs, but not specifically between two individual VNFCIs within those VNFs. For example, in some VNFs, it may be difficult to pick out individual VNFCIs for testing (e.g. where the VNFCIs form a pool in which a given VNFCI cannot be specified). In such cases, interoperability testing may be performed at a VNF level, rather than a VNFCI level.

Figure 2B:
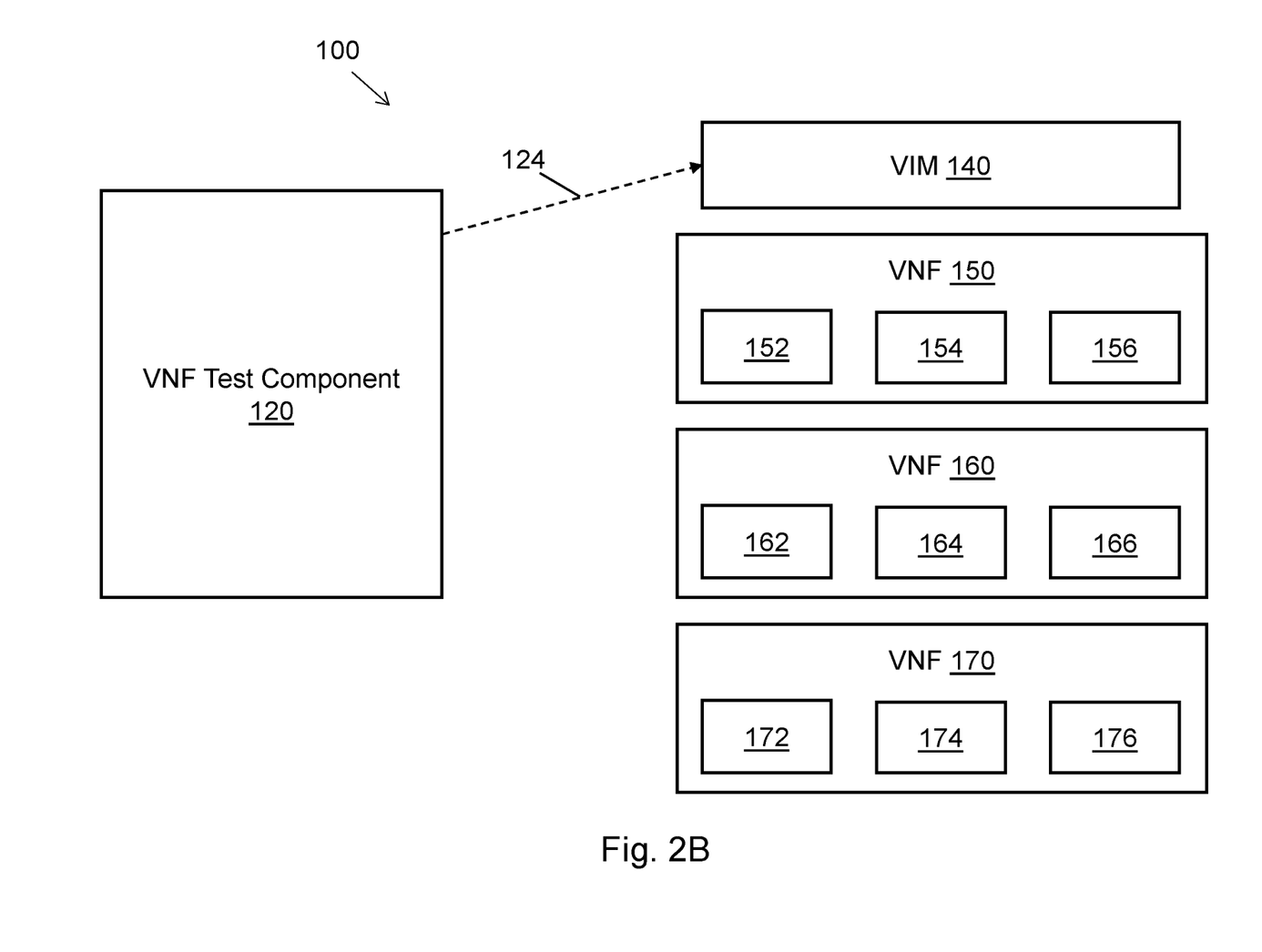

Referring to FIG. 2B, the VNF testing component 120 performs environment readiness testing 124. The environment readiness testing 124 is performed by interrogating the VIM component 140.

In embodiments in which the VNF testing component 120 performs both interoperability testing 122 and environment readiness testing 124, the environment readiness testing 124 may be performed before the interoperability testing 122.

In embodiments, the environment readiness testing 124 is performed before one or more VNFCIs are instantiated in the environment 100 to perform a given VNF. In some cases, the environment readiness testing 124 is performed before any VNFCIs are instantiated in the environment 100. Performing such environment readiness testing 124 prior to instantiating VNFCIs enables a more efficient use of time and/or resources compared to a case in which such testing is not performed. For example, deploying VNFCIs in a virtualized environment where the infrastructure is not ready and/or not sufficient can lead not only to errors and/or poor performance of the VNF, but also time spent in re-configuring and/or re-commissioning the VNF in some cases. Such wasted time is reduced through use of the environment readiness testing 124. Further, performing environment readiness testing 124 allows potential errors to be identified as early as possible in the commissioning process.

In embodiments, performing the environment readiness testing 124 comprises interrogating the VIM component 140 of the virtualized environment 100 to ascertain whether the virtualized environment 100 comprises sufficient resources to fulfil commissioning of a given VNF (e.g. one of the VNFs 150, 160, 170). Such resources may comprise one or more of: central processing unit (CPU) resources, storage resources, and memory resources. The environment readiness testing 124 may be performed in relation to other types of resource in alternative embodiments.

In response to the environment readiness testing 124 determining that the virtualized environment 100 does comprise sufficient resources to fulfil commissioning of the VNF, the VIM component 140 is instructed to instantiate one or more VNFCIs in the virtualized environment 100. The one or more VNFCIs are operable to perform at least part of the VNF. For example, the VNF testing component 120 may test whether the environment 100 comprises sufficient resources to fulfil the commissioning of the first VNF 150, and in response to a positive result thereof, one or more of the VNFCIs 152, 154, 156 may be instantiated. In embodiments, the VIM component 140 is instructed by a virtualized VNF manager (VNFM) component, e.g. the VNF manager component 116 as shown in FIG. 1.

Figure 2C:
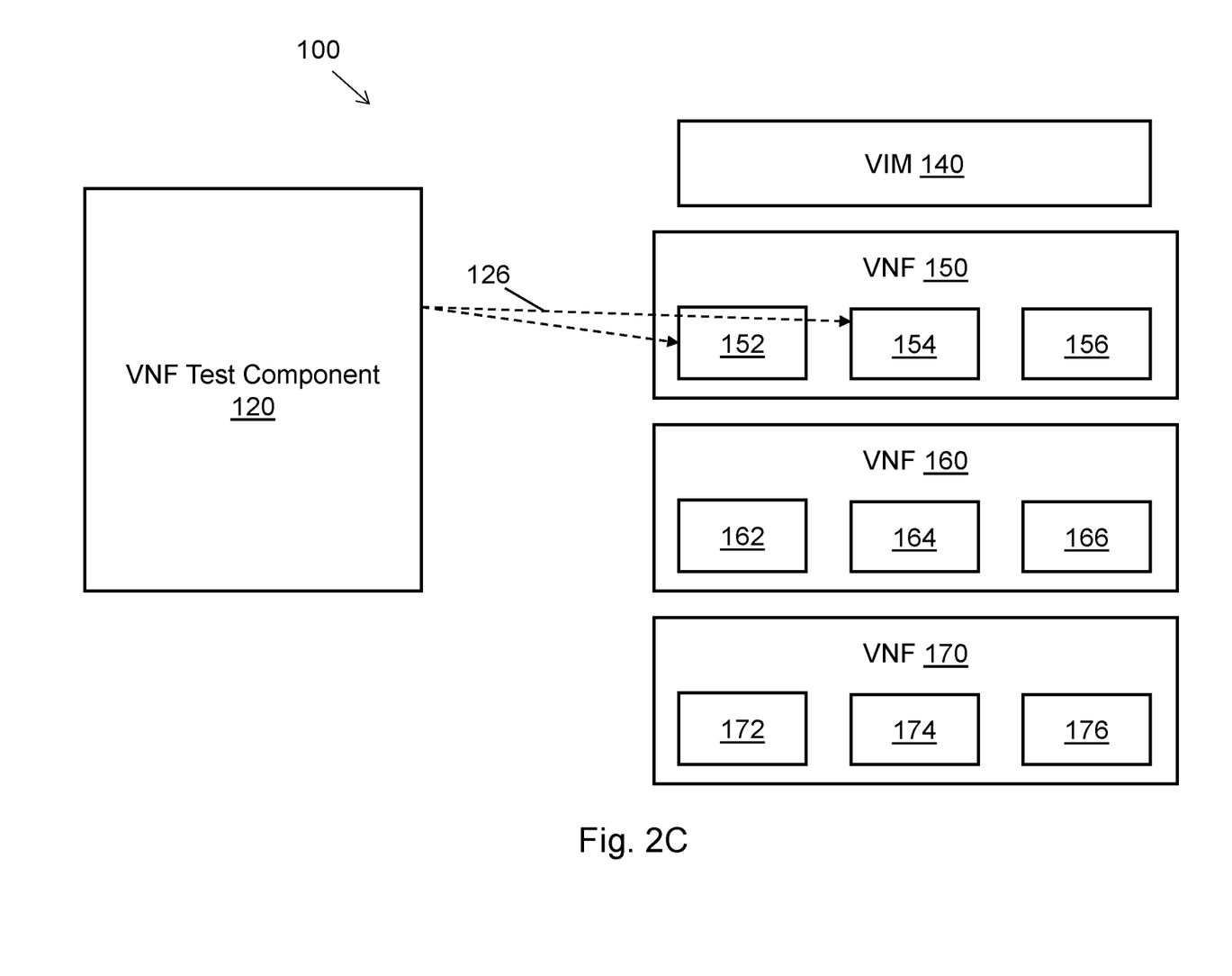

Referring to FIG. 2C, the VNF testing component 120 performs VNFCI validation testing 126. The VNFCI validation testing 126 may be performed on one or more than one VNFCI in the virtualized environment 100. In the embodiments shown in FIG. 2C, VNFCI validation testing 126 is performed with respect to a first VNFCI 152 and a second VNFCI 154 that are operable to perform at least part of the first VNF 150.

In embodiments in which the VNF testing component 120 is configured to perform both interoperability testing 122 and VNFCI validation testing 126, the VNFCI validation testing 126 may be performed before the interoperability testing 122. In alternative embodiments, the interoperability testing 122 is performed before the VNFCI validation testing 126.

In embodiments, performing the VNFCI validation testing 126 comprises testing that the state of a given VNFCI is as expected. Such a state may be a configuration state, an operation state, a connectivity state, etc. In some embodiments, performing the VNFCI validation testing 126 comprises testing that the state of multiple VNFCIs within a given VNF is as expected. The multiple VNFCIs may comprise a cluster of VNFCIs within the given VNF. The VNFCI validation testing 126 may comprise testing consistency across the cluster. For example, performing the VNFCI validation testing 126 may comprise testing that the VNFCIs in the cluster agree on a leader.

Figure 2D:
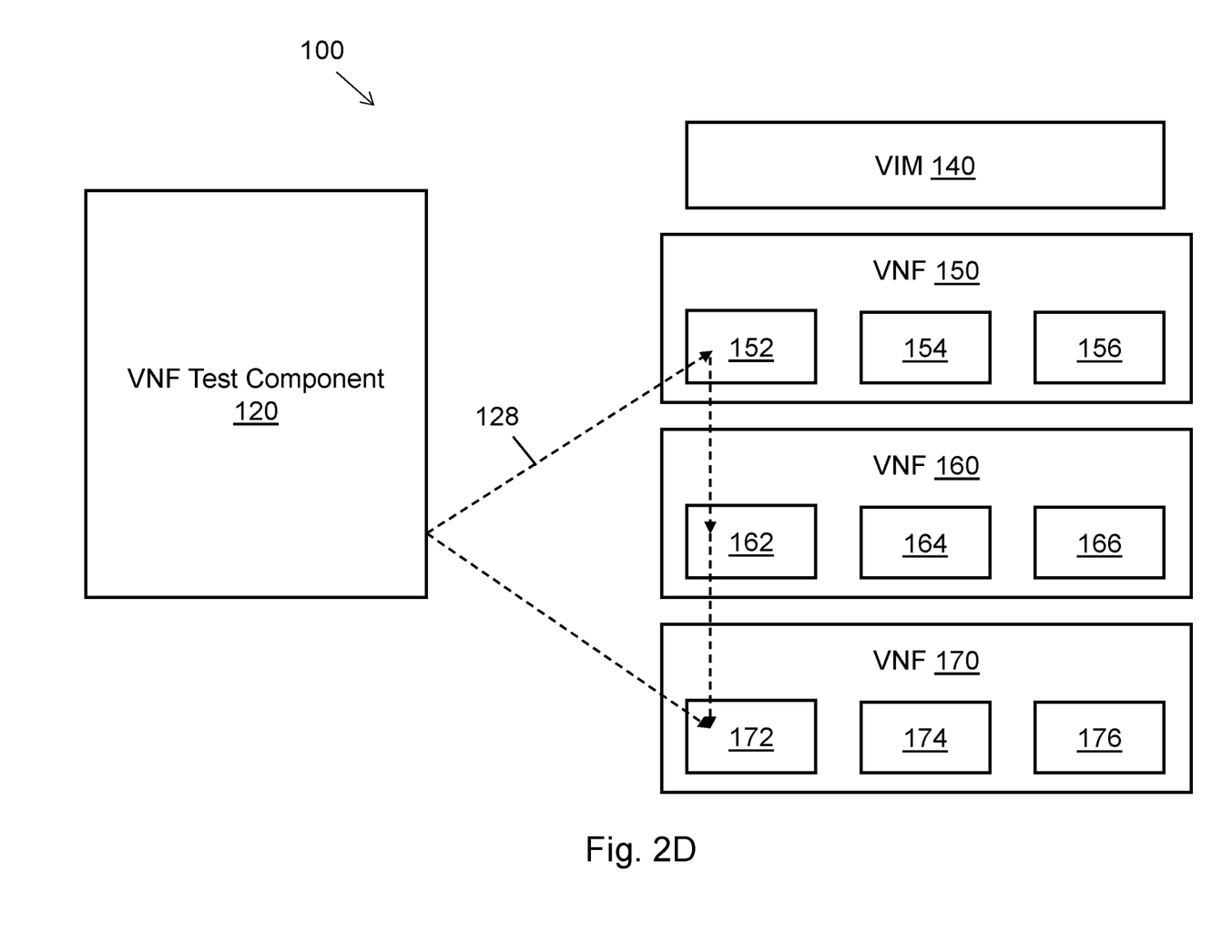

Referring to FIG. 2D, the VNF testing component 120 performs end-to-end integration testing 128. In this embodiment, end-to-end integration testing 128 involves VNFCIs instantiated within each of the VNFs 150, 160, 170. In embodiments in which more or fewer VNFs are commissioned, end-to-end integration testing 128 similarly involves more or fewer VNFs.

In embodiments in which the VNF testing component 120 is configured to perform both interoperability testing 122 and end-to-end integration testing 128, the interoperability testing 122 may be performed before the end-to-end integration testing 128. In alternative embodiments, the end-to-end integration testing 128 is performed before the interoperability testing 122.

In embodiments, the end-to-end integration testing 128 comprises testing operation of all VNFCIs instantiated in the plurality of VNFs 150, 160, 170, including the first VNFCI 152, the second VNFCI 162 and at least one other VNFCI 172. In alternative embodiments, end-to-end integration testing 128 comprises testing operation of a subset of VNFCIs in the environment 100.

In embodiments, the end-to-end integration testing 128 comprises the VNF testing component 120 configuring each VNFCI instantiated in the plurality of VNFs 150, 160, 170 with predetermined end-to-end integration test configuration data. The VNF testing component 120 then determines whether each VNFCI operates in an expected manner during an end-to-end integration test. Performing an end-to-end integration test may comprise initiating a test call. In other words, end-to-end integration testing may involve testing that a chain of VNFs behaves in an expected manner.

In embodiments, the predetermined integration test configuration data comprises generic predetermined integration test configuration data which is suitable for testing multiple, different customer networks. That is, the predetermined integration test configuration data is non-specific to the particular customer network. In embodiments, the predetermined integration test configuration data comprises routing configuration data. Configuring the VNFCIs with predetermined test configuration data allows greater control over the end-to-end test process compared to a case in which such predetermined test configuration data is not used (e.g. where the routing configuration of the system is unknown). Using predetermined end-to-end test configuration data allows a predetermined behavior of the system (and/or a predetermined routing) to be checked, as opposed to an unknown behavior and/or routing.

In embodiments, performing the end-to-end integration testing comprises instantiating additional load-generating VMs in the environment 100. As such, end-to-end integration testing may be used to test the performance of the VNFs under a predetermined load.

In embodiments of the present disclosure, the VNF testing component 120 is configured to perform acceptance testing (not shown) of the plurality of VNFs 150, 160, 170. The acceptance testing may be performed after end-to-end integration testing. In embodiments, the acceptance testing comprises configuring each VNFCI instantiated in the plurality of VNFs 150, 160, 170 with customer configuration data, and determining whether each VNFCI operates in an expected manner. The customer configuration data is different from the predetermined end-to-end integration test configuration data described above. The customer configuration data may be specific to the particular customer network. As such, the acceptance testing allows the VNF testing component 120 to validate that the VNFs are behaving in a manner that the customer expects. In embodiments, acceptance testing involves testing the overall network service, including the customer network and/or one or more external third party elements.

Figure 3:
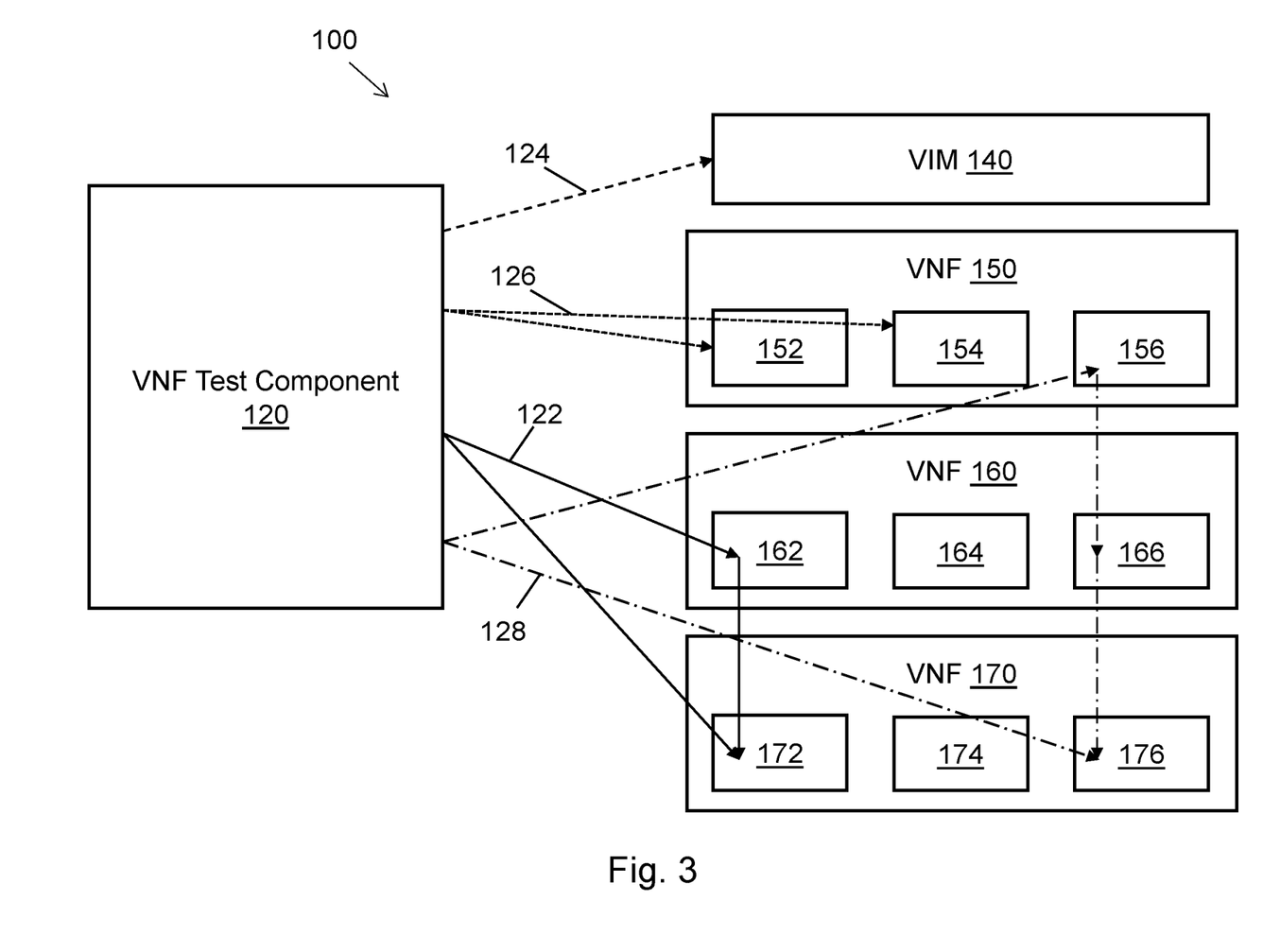
FIG. 3 shows a schematic view of a virtualized environment of a customer network according to embodiments of the present disclosure.

FIG. 3 shows the VNF testing component 120 performing testing of the plurality of VNFs 150, 160, 170 in the environment 100. In the embodiments shown in FIG. 3, the VNF testing component 120 performs environment readiness testing 124, VNFCI validation testing 126, interoperability testing 122 and end-to-end integration testing 128. In alternative embodiments, the VNF testing component 120 does not perform at least one of the types of testing 122, 124, 126, 128.

Figure 4:
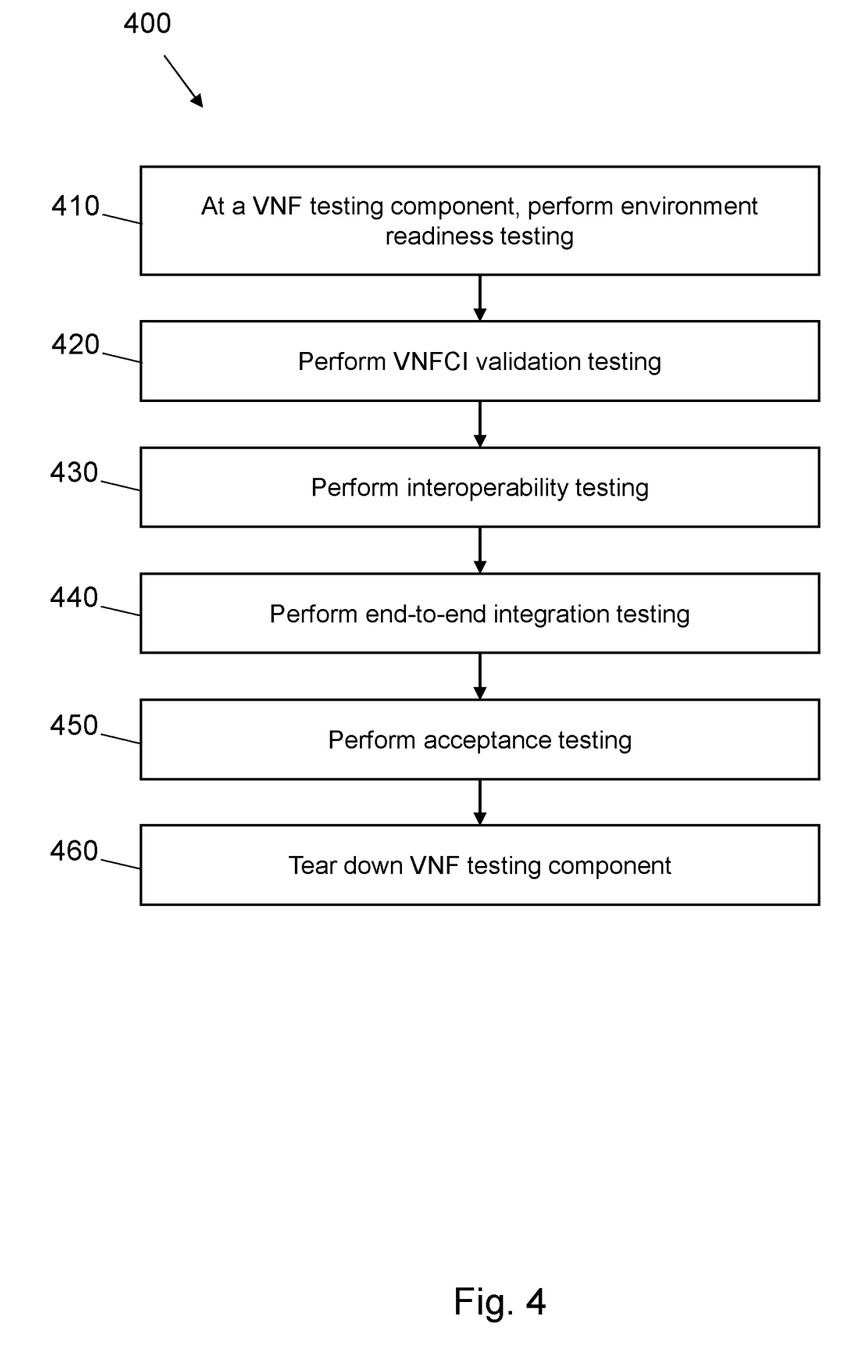
FIG. 4 shows a flow chart depicting a method of testing virtual network functions during commissioning of the virtual network functions according to embodiments of the present disclosure.

Referring to FIG. 4, there is shown a method 400 of testing a plurality of VNFs during commissioning of the VNFs in a virtualized environment of a customer network, according to embodiments. The method 400 may be performed at least in part by the VNF testing component 120 described with reference to FIGS. 1 to 3 above. The VNF testing component 120 is configured to have access to the virtualized environment of the customer network. The VNF testing component 120 may, however, be logically distinct from other entities of the customer network.

The method 400 is performed in relation to a first VNFCI within a first VNF of a plurality of VNFs and a second VNFCI within a second VNF of the plurality of VNFs, the second VNF being different from the first VNF, the first VNF and the second VNF comprising a subset of VNFs within the plurality of VNFs.

At item 410, environment readiness testing is performed at the VNF testing component 120. The environment readiness testing is performed by interrogating a VIM component of the virtualized environment in the customer network.

The environment readiness testing is performed before instantiation of the first VNFCI and the second VNFCI. In embodiments, the environment readiness testing is performed before instantiation of any VNFCIs in the plurality of VNFs. The environment readiness testing may be considered to represent a first testing phase, in that the environment readiness testing is performed before one or more other types of testing in some embodiments, e.g. interoperability testing.

In embodiments, performing the environment readiness testing comprises interrogating the VIM component 140 to ascertain whether the virtualized environment 100 comprises sufficient resources to fulfil commissioning of the plurality of VNFs. In embodiments, performing the environment readiness testing comprises interrogating the VIM component 140 to ascertain whether desired configuration for the given VNF corresponds with configuration available on the VIM component 140.

At item 420, VNFCI validation testing is performed at the VNF testing component 120. The VNFCI validation testing may be considered to represent a second testing phase. The VNFCI validation testing is performed after the first and/or second VNFCIs have been instantiated. As such, the VNFCI validation testing may be performed after the environment readiness testing. In embodiments, the VNFCI validation testing is performed before one or more other types of testing, e.g. interoperability testing.

In embodiments, the VNFCI validation testing comprises testing that the state of the first VNFCI is as expected and that the state of the second VNFCI is as expected. In alternative embodiments, VNFCI validation testing is performed on only one VNFCI.

In embodiments, the VNFCI validation testing comprises testing that the state of multiple VNFCIs within a given VNF in the plurality of VNFs is as expected. The multiple VNFCIs may comprise a cluster of VNFCIs within the given VNF. The VNFCI validation testing may comprise testing consistency across the cluster.

At item 430, interoperability testing is performed at the VNF testing component 120. Interoperability testing is performed between the first VNFCI and the second VNFCI. Performing the interoperability testing comprises instructing the first VNFCI to interoperate directly with the second VNFCI in a predetermined manner, and determining whether the second VNFCI reacts to the instructed direct interoperation in an expected manner.

In embodiments, the determining comprises monitoring operation of the second VNFCI and/or monitoring operation of the first VNFCI. In embodiments, the determining comprises monitoring operation of one or more VNFCIs within the plurality of VNFs other than the first VNFCI and the second VNFCI.

Interoperability testing may be considered to represent a third testing phase. The interoperability testing may be performed after the environment readiness testing and/or the VNFCI validation testing. The interoperability testing may be performed before one or more further types of testing, e.g. end-to-end integration testing. In alternative embodiments, the interoperability testing is performed before the VNFCI validation testing and/or the environmental readiness testing.

At item 440, end-to-end integration testing is performed at the VNF testing component 120. The end-to-end integration testing involves VNFCIs instantiated within each of the VNFs in the plurality of VNFs. End-to-end integration testing may be considered to represent a fourth testing phase. The end-to-end integration testing may be performed after the environment readiness testing, VNFCI validation testing and/or interoperability testing. In alternative embodiments, the end-to-end integration testing is performed before one or more of the environment readiness testing, VNFCI validation testing and interoperability testing.

In embodiments, the end-to-end integration testing comprises testing operation of all VNFCIs instantiated in the plurality of VNFs, including the first VNFCI, the second VNFCI and at least one other VNFCI. As such, the end-to-end integration testing may involve a greater number of VNFCIs than the interoperability testing involves.

In embodiments, the end-to-end integration testing comprises configuring each VNFCI instantiated in the plurality of VNFs with predetermined integration test configuration data, and determining whether each VNFCI operates in an expected manner during end-to-end integration testing.

At item 450, acceptance testing is performed at the VNF testing component 120. Acceptance testing may be considered to represent a fifth testing phase. The acceptance testing may be performed after the environment readiness testing, VNFCI validation testing, interoperability testing and/or end-to-end integration testing. In alternative embodiments, the acceptance testing is performed before one or more of the environment readiness testing, VNFCI validation testing, interoperability testing and end-to-end integration testing. In some embodiments, the acceptance testing is included in the end-to-end integration testing.

In embodiments, the acceptance testing comprises configuring each VNFCI instantiated in the plurality of VNFs with customer configuration data, and determining whether each VNFCI operates in an expected manner. The customer configuration data may be different from the predetermined integration test configuration data.

In embodiments in which the VNF testing component 120 is comprised in or communicatively coupled with the commissioning VM 110, the commissioning VM 110 may obtain commissioning data defining how the plurality of VNFs have been commissioned. In such embodiments, the VNF testing component 120 employs at least a part of the obtained commissioning data in testing the plurality of VNFs. The commissioning data may be used in one or more of the interoperability testing, the end-to-end integration testing, the VNFCI validation testing, the acceptance testing and the environment readiness testing.

At item 460, the VNF testing component 120 is torn down. In embodiments, teardown of the VNF testing component 120 is performed in response to completion of the commissioning of the plurality of VNFs. In some cases, teardown of the VNF testing component 120 is performed in response to a positive result from the testing performed by the VNF testing component 120. In embodiments, for example where the VNF testing component 120 is comprised in the commissioning VM 110, teardown of the VNF testing component may be in response to receipt of a command via the remote access connection facility 115. That is, a remote engineer operating the commissioning VM 110 and/or the VNF testing component 120 can initiate teardown of the VNF testing component 120 once the commissioning process is completed. Tearing down the VNF testing component 120 saves resources (e.g. storage resources, processing resources, and/or memory resources) compared to a case in which such teardown does not occur. Therefore, testing performed by the VNF testing component 120 may be cheaper (e.g. in terms of resources) than testing using an entity which is not subsequently torn down.

In embodiments, the commissioning VM 110 may also be torn down in response to completion of the commissioning of the VNFs. In some cases, configuration data is saved from the commissioning VM 110 prior to the commissioning VM 110 being torn down. For example, IP addresses for the VNFCIs in the environment and/or topology information may be saved. This can enable subsequent testing to be performed after teardown of the commissioning VM 110, using pre-existing testing data. This may be more efficient and/or reliable than performing such testing without using pre-existing testing data. Such subsequent testing may be performed by a VNF testing component located separately from the commissioning VM 110, e.g. a VNF testing component comprised in a deployment manager. Additionally or alternatively, such subsequent testing may be performed by reinstantiating a commissioning VM that comprises a VNF testing component.

Embodiments comprise measures, including methods, apparatus and computer program products, for use in testing a plurality of virtual network functions (VNFs) during commissioning of the plurality of VNFs in a virtualized environment of a customer network. At a virtualized VNF testing component instantiated in the virtualized environment in the customer network, end-to-end integration testing of the plurality of VNFs is performed. The end-to-end integration testing involves VNFCIs instantiated within each of the VNFs in the plurality of VNFs. The end-to-end integration testing comprises the virtualized VNF testing component. Each VNFCI instantiated in the plurality of VNFs is configured with predetermined end-to-end integration test configuration data. It is then determined whether each VNFCI operates in an expected manner during end-to-end integration testing.

Embodiments comprise measures, including methods, apparatus and computer program products, for use in testing a virtualized environment in a customer network for commissioning a virtual network function (VNF) in the virtualized environment. At a virtualized VNF testing component of a virtual machine instantiated within the virtualized environment in the customer network, environment readiness testing is performed by interrogating a virtual infrastructure manager (VIM) component of the virtualized environment in the customer network to determine whether the virtualized environment comprises sufficient resources to fulfil commissioning of the VNF. In response to the environment readiness testing determining that the virtualized environment does comprise sufficient resources to fulfil commissioning of the VNF, at a virtualized virtual network function manager (VNFM) component, the VIM component is instructed to instantiate one or more virtual network function component instantiations (VNFCIs) in the virtualized environment. The one or more VNFCIs are operable to perform at least a part of the VNF.

The VNF testing component 120 as described above may be comprised in or implemented in apparatus comprising a processor or processing system. The processing system may comprise one or more processors and/or memory. Each device, module, component, machine or function as described in relation to any of the examples described herein, for example the commissioning VM 110 may similarly comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of testing a plurality of virtual network functions (VNFs) by a VNF testing component during pre-deployment commissioning of the plurality of VNFs in a virtualized environment of a customer network, the method comprising:
    during the pre-deployment commissioning of the plurality of VNFs, causing instantiation of a first VNF component instantiation (VNFCI) of a first VNF and a second VNFCI of a second VNF, the second VNF being different from the first VNF;
    receiving a cloud service archive (CSAR) file containing configuration data for commissioning the plurality of VNFs;
    receiving predetermined test configuration data that is unique to capabilities and properties of the customer network in which the VNFs are to be commissioned;
    wherein the CSAR file is usable to provide description data to a VNF descriptor component of the VNF testing component, the description data comprising a template defining the VNFs that are to be commissioned;
    updating, by the VNF descriptor component, the predetermined test configuration data with the data obtained from the CSAR file;
    configuring the first and second VNFCIs based on the CSAR file and the predetermined test configuration data;
    based on the CSAR file and the predetermined test configuration data, instructing the first VNFCI to interoperate directly with the second VNFCI in a predetermined manner; and
    determining whether the second VNFCI reacts to the instructed direct interoperation in an expected manner.

2. The method according to claim 1, wherein the VNF testing component is logically distinct from other components within the customer network.

3. The method according to claim 1, wherein the VNF testing component is logically distinct from the first VNFCI and the second VNFCI.

4. The method according to claim 1, wherein the determining comprises at least one of: monitoring operation of the second VNFCI or monitoring operation of the first VNFCI.

5. The method according to claim 1, wherein the determining comprises monitoring operation of one or more VNFCIs within the plurality of VNFs other than the first VNFCI and the second VNFCI.

6. The method according to claim 1, further comprising performing, at the VNF testing component, environment readiness testing by interrogating a virtual infrastructure manager (VIM) component of the virtualized environment in the customer network, wherein the environment readiness testing is performed before the instructed direct interoperation.

7. The method according to claim 6, wherein the environment readiness testing is performed before at least instantiation of the first VNFCI and the second VNFCI.

8. The method according to claim 6, wherein:
    performing the environment readiness testing comprises interrogating the VIM component to ascertain whether the virtualized environment comprises resources sufficient to fulfil commissioning of the plurality of VNFs, and
    the resources comprise one or more of:
    central processing unit (CPU) resources,
    storage resources, or
    memory resources.

9. The method according to claim 6, wherein performing the environment readiness testing comprises interrogating the VIM component to ascertain whether desired configuration for the plurality of VNFs corresponds with configuration available on the VIM component.

10. The method according to claim 1, further comprising:
at the VNF testing component, performing VNFCI validation testing, wherein:
the VNFCI validation testing is performed before the instructed direct interoperation, and
the VNFCI validation testing comprises testing that a state of the first VNFCI is as expected and testing that a state of the second VNFCI is as expected.

11. The method according to claim 10, wherein:
the VNFCI validation testing comprises testing that a state of multiple VNFCIs within a given VNF in the plurality of VNFs is as expected,
the multiple VNFCIs comprise a cluster of VNFCIs within the given VNF, and
the VNFCI validation testing comprises testing consistency across the cluster.

12. The method according to claim 1, further comprising:
performing, at the VNF testing component, end-to-end integration testing of the plurality of VNFs, the end-to-end integration testing involving VNFCIs instantiated within each of the VNFs in the plurality of VNFs, wherein the end-to-end integration testing is performed after the instructed direct interoperation.

13. The method according to claim 12, wherein the end-to-end integration testing comprises testing operation of all VNFCIs instantiated in the plurality of VNFs, including the first VNFCI, the second VNFCI, and at least one other VNFCI.

14. The method according to claim 12, wherein the end-to-end integration testing comprises:
configuring each VNFCI instantiated in the plurality of VNFs with predetermined integration test configuration data; and
determining whether each VNFCI operates in an expected manner during end-to-end integration testing.

15. The method according to claim 14, wherein the predetermined integration test configuration data comprises generic predetermined integration test configuration data which is suitable for testing multiple, different customer networks.

16. The method according to claim 12, further comprising:
performing, at the VNF testing component, acceptance testing of the plurality of VNFs,
wherein the acceptance testing is performed after the instructed direct interoperation, and
wherein the acceptance testing is performed after the end-to-end integration testing.

17. The method according to claim 1, wherein the VNF testing component is comprised in a virtual machine configured to commission the plurality of VNFs in the virtualized environment in the customer network.

18. The method according to claim 17, further comprising:
at the virtual machine, obtaining commissioning data defining how the plurality of VNFs have been commissioned,
wherein the VNF testing component employs at least a part of the obtained commissioning data in testing of the plurality of VNFs.

19. The method according to claim 1, further comprising, in response to completion of the commissioning of the plurality of VNFs, tearing down the VNF testing component.

20. An apparatus, comprising:
at least one processor; and
at least one memory including computer program code that, when executed by the at least one processor, cause the apparatus at least to perform operations comprising:
during pre-deployment commissioning of a plurality of VNFs, causing instantiation of a first VNF component instantiation (VNFCI) of a first VNF and a second VNFCI of a second VNF, the second VNF being different from the first VNF;
receiving a cloud service archive (CSAR) file containing configuration data for commissioning the plurality of VNFs;
receiving predetermined test configuration data that is unique to capabilities and properties of a customer network in which the VNFs are to be commissioned;
wherein the CSAR file is usable to provide description data to a VNF descriptor component of the VNF testing component, the description data comprising a template defining the VNFs that are to be commissioned;
updating, by the VNF descriptor component, the predetermined test configuration data with the data obtained from the CSAR file;
configuring the first and second VNFCIs based on the CSAR file and the predetermined test configuration data;
based on the CSAR file and the predetermined test configuration data, instructing the first VNFCI to interoperate directly with the second VNFCI in a predetermined manner; and
determining whether the second VNFCI reacts to the instructed direct interoperation in an expected manner.

21. A computer program product comprising a non-transitory computer-readable storage medium having computer-readable instructions stored thereon, the computer-readable instructions being executable by a computerized device to cause the computerized device to perform operations comprising:
during pre-deployment commissioning of a plurality of VNFs, causing instantiation of a first VNF component instantiation (VNFCI) of a first VNF and a second VNFCI of a second VNF, the second VNF being different from the first VNF;
receiving a cloud service archive (CSAR) file containing configuration data for commissioning the plurality of VNFs;
receiving predetermined test configuration data that is unique to capabilities and properties of a customer network in which the VNFs are to be commissioned;
wherein the CSAR file is usable to provide description data to a VNF descriptor component of the VNF testing component, the description data comprising a template defining the VNFs that are to be commissioned;
updating, by the VNF descriptor component, the predetermined test configuration data with the data obtained from the CSAR file;
configuring the first and second VNFCIs based on the CSAR file and the predetermined test configuration data;
based on the CSAR file and the predetermined test configuration data, instructing the first VNFCI to interoperate directly with the second VNFCI in a predetermined manner; and
determining whether the second VNFCI reacts to the instructed direct interoperation in an expected manner.

* * * * *